United States Patent [19]
Ohkubo

[11] Patent Number: 5,430,540
[45] Date of Patent: Jul. 4, 1995

[54] LUMINOUS FLUX MEASURING APPARATUS USING AN INTEGRATING HEMISPHERE OR AN INTEGRATING QUARTER SPHERE

[75] Inventor: Kazuaki Ohkubo, Takatsuki, Japan

[73] Assignee: Matsushita Electric Industrial Co., Ltd., Kadoma, Japan

[21] Appl. No.: 149,046

[22] Filed: Nov. 8, 1993

[30] Foreign Application Priority Data

Nov. 27, 1992 [JP] Japan .................................. 4-317645

[51] Int. Cl.⁶ .............................................. G01J 1/04
[52] U.S. Cl. ................................... 356/236; 250/228
[58] Field of Search ....................... 356/236, 218, 225; 250/228

[56] References Cited
U.S. PATENT DOCUMENTS 4,378,159 3/1983 Galbraith ..................... 356/236

FOREIGN PATENT DOCUMENTS 2253123 10/1990 Japan .

Primary Examiner—Richard A. Rosenberger
Assistant Examiner—Jason D. Eisenberg
Attorney, Agent, or Firm—Ratner & Prestia

[57] ABSTRACT

A luminous flux measuring apparatus includes an integrating hemisphere which has a hemisphere shape and an inner wall. The inner wall has a light diffusing material applied thereto. A flat mirror is installed to cover the first opening of integrating hemisphere. A second opening is located at the center of the flat mirror and the window has the same configuration of longitudinal cross section of the illuminant to be measured. A light detector which has a light-intercepting window is located inside the integrating hemisphere. Finally, the flux measuring apparatus includes a means for holding the illuminant in the window of the mirror at the center of curvature of the integrating hemisphere.

4 Claims, 5 Drawing Sheets

LUMINOUS FLUX MEASURING APPARATUS USING AN INTEGRATING HEMISPHERE OR AN INTEGRATING QUARTER SPHERE

BACKGROUND OF THE INVENTION

The present invention relates to an apparatus for measuring a total flux of a lamp by the use of an integrating photometer. The integrating photometer is in wide practical use today in the field of optical radiometry.

It is desirable in the development or quality control of incandescent lamps or various discharge lamp, to accurately measure the total flux value of a lamp.

In measuring the total flux of the lamp, an integrating photometer is generally used. The integrating photometer is a device which comprises an integrating sphere having a photometric window defined in a wall thereof, a spectrometer for measuring light transmitted through the window, a lamp holder for holding and lighting a lamp to be measured inside the integrating sphere, and a baffle for shielding that portion of light, emitted from the lamp when the lamp is turned on, which travels directly towards the window.

The entire interior wall surface of the integrating sphere is a white diffusion surface so as to permit the interior wall surface to exhibit a uniform illuminance when radiated by the lamp. The uniformed illuminance is caused by the effect of interreflection taking place inside the integrating sphere.

A total flux measuring apparatus currently in use measures the total flux of the lamp by comparing it with a known total flux value of a standard lamp.

When the lamp to be measured is turned on, the flux emitted from this lamp is interreflected inside the integrating sphere. The white diffusion surface of the inner wall exhibits a uniform illuminance. This uniform illuminance is detected by a photometer which is connected to the integrating sphere. This output is compared with the value which the total flux standard incandescent lamp exhibit.

Because the lamp is turned on inside the integrating sphere during the measurement, the integrating photometer can be used in a bright room. For this reason, the integrating photometer is utilized not only in total flux measurement, but also in spectral distribution measurement wherein a spectrometer is mounted on the photometric window. In addition, the integrating photometer is widely used in lamp manufacturing factories or in lamp development sections.

The integrating photometer, however, has a problem, namely, the lamp holder causes measurement errors by casting a shadow through direct or indirect light and by absorbing the light.

This problem is especially evident when using a straight tube fluorescent lamp as an illuminant to be measured. The lamp holder for a straight tube fluorescent lamp differs from a total flux standard incandescent lamp. This may cause a big error. In addition, discharge property of a low voltage mercury vapor lamp such as a fluorescent lamp is determined by the low temperature luminous part of the lamp. When this lamp is the illuminant to be measured, the heat and radiation emitted from the lamp cause an increase of temperature of the integrating sphere which is a closed space. Thus, it may be difficult to measure the total flux accurately.

An integrating sphere having diameter of 1.5 m is used. A cylindrical lamp holder having the same radius of the straight tube fluorescent lamp, to be measured is installed along the diameter of the integrating sphere and applied with the same light diffusing material $BaSO_4$ as the interior wall of the integrating sphere. The lamp holder is also coated with $BaSO_4$. The total flux of a 40 W straight tube type fluorescent lamp is measured.

When the diffuse reflectance of $BaSO_4$ is 95%, the absorption of flux by the lamp holder is about 2 to 3% of total flux.

In measuring the total flux in practice, total flux of the illuminant to be measured is estimated by comparing the total flux standard incandescent lamp.

The lamp holder of the total flux standard incandescent lamp is within the integrating sphere. Absorption of the lamp holder depends on shape and spatial distribution of luminous intensity of the illuminant. In addition, the illuminant has a self-absorption of the flux.

These factors cause a 5% error in total flux measurement.

To correct the error, a supplement lamp is installed in the integrating sphere. The absorption of total flux standard incandescent lamp with lamp holder and luminant to be measured with lamp holder are measured respectively. This allows a measurement to be performed to correct the error.

SUMMARY OF INVENTION

The present invention relates to a luminous flux measuring apparatus which includes an integrating hemisphere which has hemisphere shape and an inner wall on which a light diffusing material is applied, a flat mirror which is installed to cover the opening of the integrating hemisphere, and a second opening in the center of the flat mirror having the same configuration of longitudinal cross section of the illuminant to be measured, a photometer which has a light-intercepting window located inside the integrating hemisphere, and a means for installing the illuminant to be measured at the center of curvature of the integrating hemisphere.

In one exemplary embodiment, means for installing the illuminant has a rotation axis to rotate the illuminant to be measured.

Further, the present invention relates to a luminous flux measuring apparatus which includes an integrating hemisphere which has a hemisphere shape, an inner wall on which a light diffusing material is applied, a flat mirror which crosses the center of the curvature of the integrating hemisphere in order to cover the first opening (the opening is circular for example) of the integrating hemisphere, a second opening in the flat mirror being equipped at the center of the flat mirror and having the same configuration of the illuminant which luminous part is vertical to said flat mirror, a photometer which has a light-intercepting window located inside the integrating hemisphere, and a means for installing the illuminant to be measured at the center of curvature of said integrating hemisphere.

Furthermore, the present invention relates to a luminous flux measuring apparatus which includes an integrating quarter sphere which has quarter sphere shape and an inner wall on which light diffusing material is applied, a first flat mirror and a second flat mirror which cross the center of curvature of said integrating quarter sphere in order to cover the first opening of the integrating quarter sphere, and connecting part of the first flat mirror and the second flat mirror, a second opening located at the center of the connecting part of the first and second flat mirrors and having the same cross section configuration of the illuminant to be measured, a photometer which has light intercepting window at the inside of the integrating quarter sphere, and a means for installing the illuminant to be measured at the center of the integrating quarter sphere.

DETAILED DESCRIPTION OF PREFERRED EMBODIMENTS

Exemplary embodiments of the present invention are now described.

(EXAMPLE 1)

Figure 1:
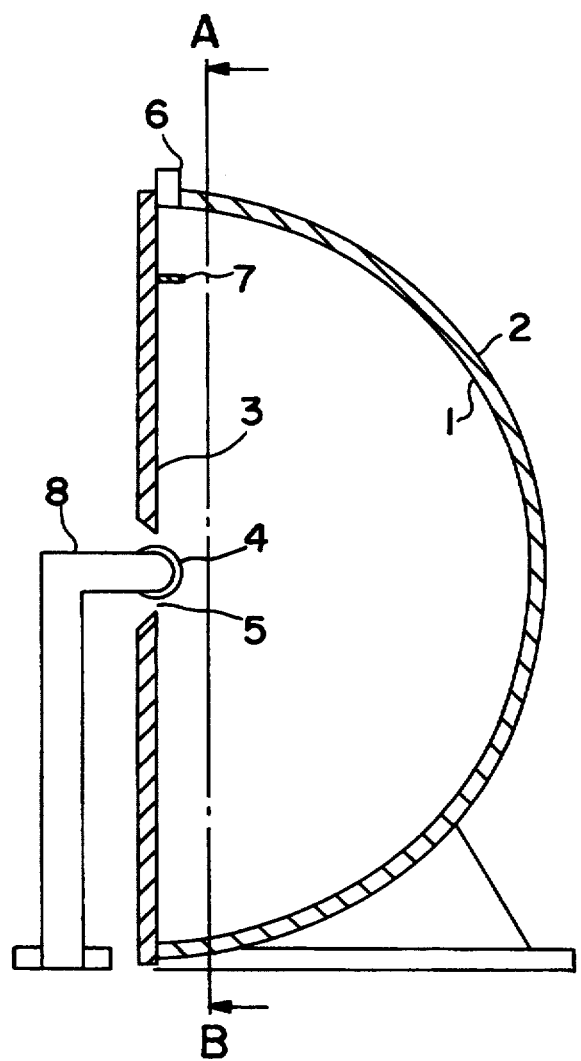
FIG. 1 is a partial cutaway view of a luminous flux measuring apparatus in accordance with an exemplary embodiment of the present invention.

FIG. 1 shows a partially cutaway view of a luminous flux measuring apparatus in accordance with a first exemplary embodiment of the invention. As shown in FIG. 1, the inner wall of the integrating hemisphere 2 which has hemisphere shape has a light diffusing material 1 $BaSO_4$ applied thereto. The means 8 for holding the illuminant 4 is also applied with $BaSO_4$. A 95% of diffuse reflectance is accomplished. The radius of the integrating hemisphere is 75 cm. Flat mirror 3 is installed in order to cover the first opening of the integrating hemisphere. Flat mirror 3 faces the inside of the integrating hemisphere 2. Second opening 5 which is located at the center of the flat mirror 3 and at the center of curvature, has the same configuration of longitudinal cross section as the illuminant 4 to be measured. In this example, a 40 W straight tube type fluorescent lamp is used as the illuminant 4.

Figure 2:
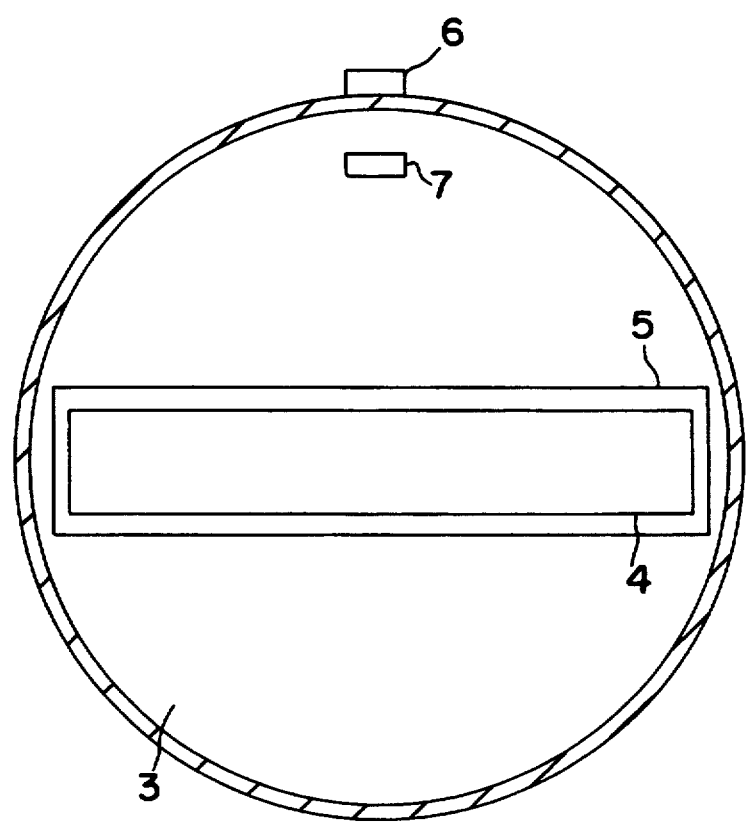
FIG. 2 is a partially cutaway perspective view of a luminous flux measuring apparatus in accordance with an exemplary embodiment of the present invention.

FIG. 2 is a cross sectional view in accordance with line A–B of the luminous measuring apparatus of FIG. 1. Window 5 has a 1.3 m longitudinal length corresponding to the length of the fluorescent lamp plus the length of socket (which is part of the means 8) supplying electric current to the fluorescent lamp.

Second opening 5 has a width of about 42 mm corresponding to the 32 mm diameter of the 40 W straight tube type fluorescent lamp.

Photometer 6 has adequate spectral responsivity for adjusting to the spectral luminous efficiency. Photometer 6 has light-intercepting window located at the inside of the integrating hemisphere 2.

Light shielding plate 7 is installed on flat mirror 3 between photometer 6 and illuminant 4 in order to shield the photometer 6 from the light emitted directly from illuminant 4. Means 8, as shown in FIG. 1, is used for installing illuminant 4 at the center of the curvature of the integrating hemisphere. Illuminant 4 is set halfway into the integrating space which is surrounded by integrating hemisphere 2 and flat mirror 3. Light flux emitted from illuminant 4 is uniformly distributed by interreflection of integrating hemisphere 2 and by the virtual image of illuminant 4 reflected on flat mirror 3. Therefore, uniform illuminance is accomplished in the integrating space.

In this case, the means 8, such as a lighting jig, is almost entirely outside the integrating space, so there is little absorption of light flux by means 8 in the integrating light flux process, i.e., the condition in which illuminant 4 is turned on without the means 8 in the integrating space is approximately accomplished.

Therefore, it is possible to measure half of the total flux emitted from the illuminant 4.

It is easy to control the temperature of integrating space because the other half of the illuminant is located outside of the integrating space and the discharge property of the low voltage mercury lamp, such as a fluorescent lamp, is determined by the lowest temperature luminous part of the lamp.

(EXAMPLE 2)

Figure 3:
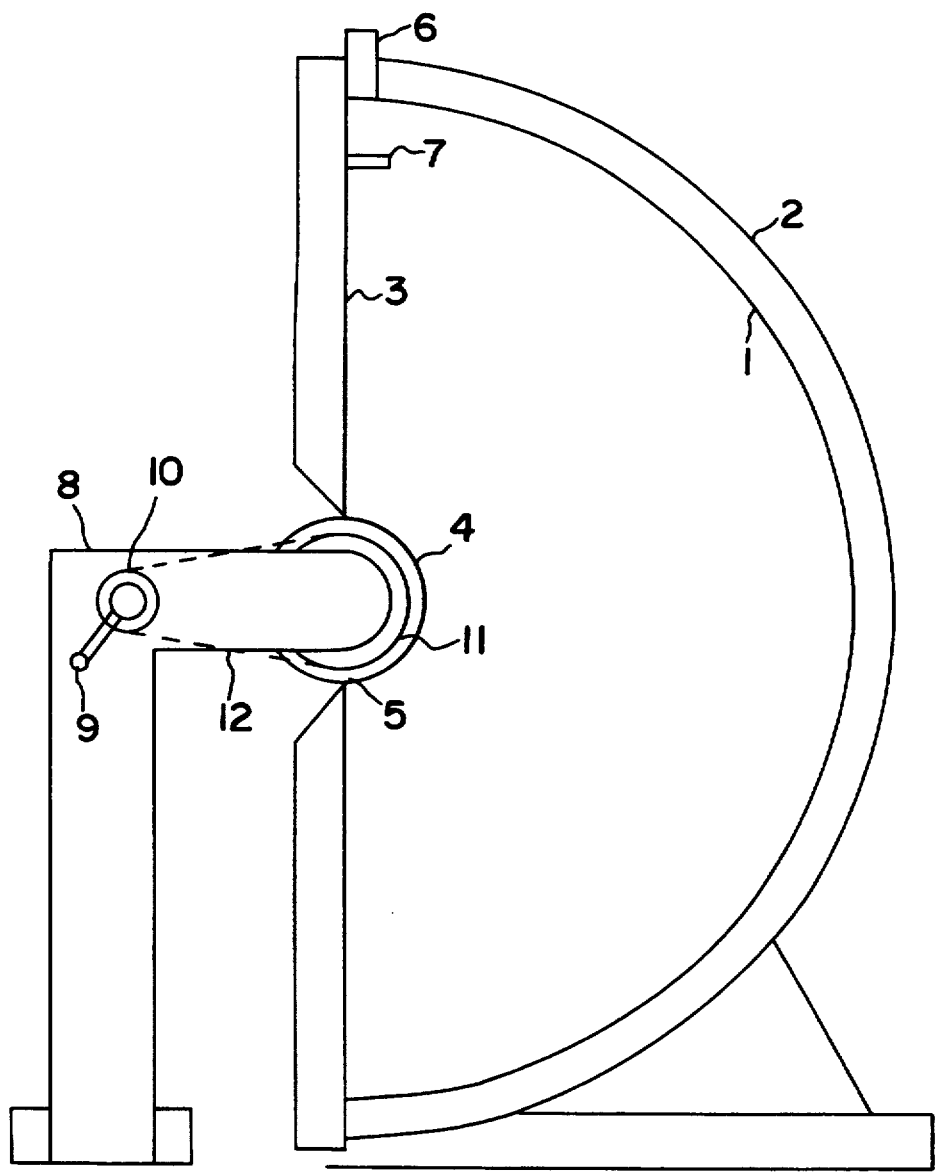
FIG. 3 is a partially cutaway view of a luminous flux measuring apparatus in accordance with an exemplary embodiment of the present invention.

In this exemplary embodiment the flux measuring apparatus described in Example 1, has a means with a rotation axis to rotate illuminant 4 around the diameter of integrating hemisphere 2 as a rotation axis. FIG. 3 shows a partially cutaway view of this example. This apparatus is effective when the illuminant 4 to be measured has no uniform light flux distribution.

One side of the lamp socket is attached to a first round pulley 11 to rotate the illuminant (florescent lamp) 4 around the diameter of the integrating hemisphere 2 as a rotation axis.

Second round pulley 10 which has a handle 9 is attached to means 8.

First round pulley 11 and second round pulley 10 are connected with belt 12.

By rotating the second round belt, illuminant (fluorescent lamp) 4 is rotated.

This is accomplished by turning the handle 9 to rotate the illuminant 4 180 degrees and measuring the light flux twice. Therefore the total light flux of an illuminant lacking uniformity can be measured.

(EXAMPLE 3)

Figure 4:
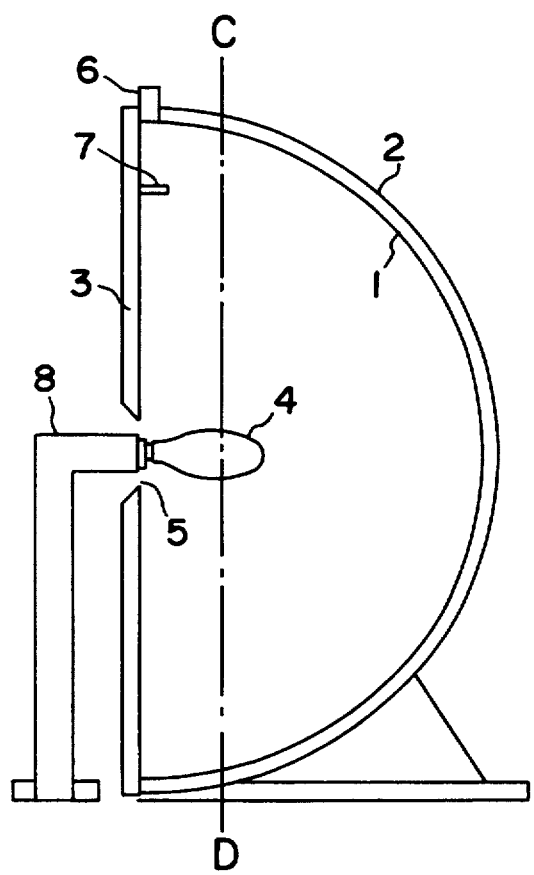
FIG. 4 is a partially cutaway view of a luminous flux measuring apparatus in accordance with an exemplary embodiment of the present invention.

In this exemplary embodiment, the flux measuring apparatus described in Example 1 has the entire illuminant 4, such as an electric light bulb having one socket, disposed in the integrating space. FIG. 4 shows a partially cutaway view of this example.

Figure 5:
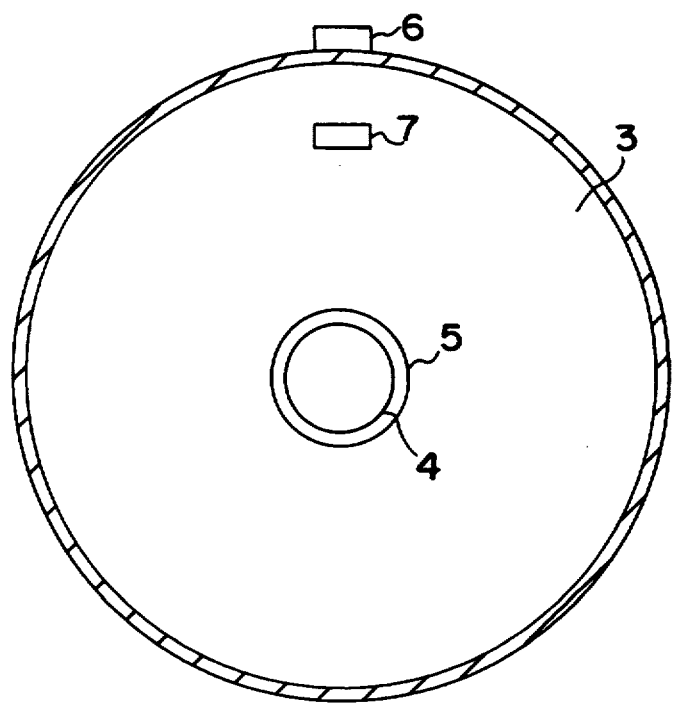
FIG. 5 is a cross sectional view of a luminous flux measuring apparatus in accordance with an exemplary embodiment of the present invention.

In this case, the luminous part of the illuminant 4 is installed vertically against flat mirror 3. This is shown in FIG. 5. FIG. 5 is a partially cutaway view in accordance with line C–D of the luminous measuring apparatus of FIG. 4.

Since the socket for supporting the electric light bulb and means 8 are outside the integrating space, the self absorption of these can be avoided.

(EXAMPLE 4)

Figure 6:
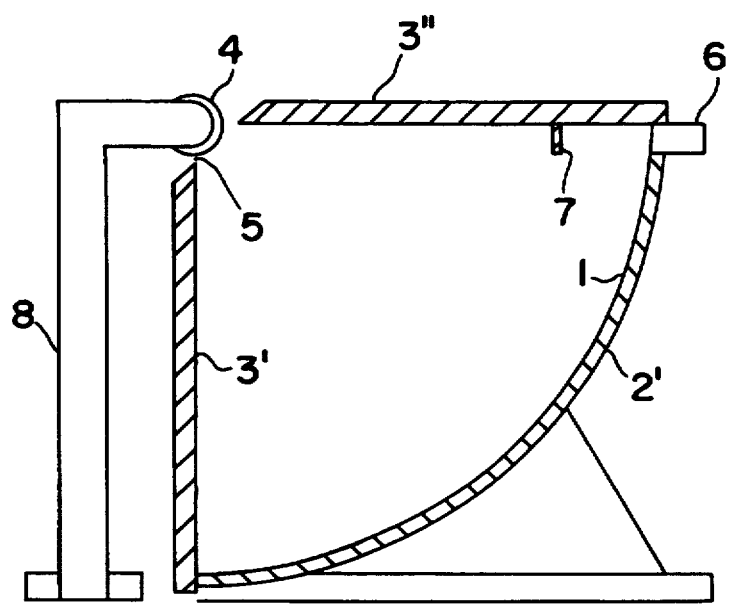
FIG. 6 is a partially cutaway view of a luminous flux measuring apparatus in accordance with an exemplary embodiment of the present invention.

FIG. 6 shows a partially cutaway view of a luminous flux measuring apparatus as another embodiment of the invention. As shown in FIG. 6, the inner wall of integrating quarter sphere 2' has a quarter shape which is covered with light diffusing material 1, $BaSO_4$. 95% of diffuse reflectance is accomplished. The radius of the integrating hemisphere is 75 cm. First flat mirror 3" and second flat mirror 3" cross the center of curvature of the integrating quarter sphere to cover the opening of the integrating quarter sphere 2'.

Window 5 is located at the center of the connecting parts of the first flat mirror 3' and the second flat mirror 3Δ. The window has the same quarter longitudinal cross section as the illuminant 4.

Window 5 has a width of about 21 mm corresponding to the 32 mm diameter of the 40 W straight tube type fluorescent lamp.

Photometer 6 has a light intercepting window located inside the integrating quarter sphere 2'.

Light shielding plate 7 is installed on the second flat mirror 3" and between photometer 6 and illuminant 4 in order to shield the photometer from light emitted directly from illuminant 4. Means 8 is used to install illuminant 4 at the center of the curvature of the integrating quarter sphere. Illuminant 4 is set in the integrating space which is surrounded by the integrating quarter sphere 2, first flat mirror 3' and second flat mirror 3".

Light flux emitted from illuminant 4 is uniformly distributed by integrating hemisphere 2 and the virtual image of illuminant 4 reflected in first flat mirror 3 and second flat mirror 3". Therefore uniform illuminance is accomplished in the integrating space.

Means 8 is outside the integrating space, so there is no absorption of light flux by the means in the process of integrating light flux. i.e., the condition in which illuminant 4 turned on without the means 8 in the integrating space is approximately accomplished.

Therefore, it is possible to measure quarter of the total flux emitted from the illuminant 4.

In addition, it is easy to control the temperature of integrating space because a substantial portion of the illuminant 4 is outside of the integrating space.

The pulleys in example 2, and the illuminant with one socket disclosed in example 3 can be integrated with the quarter sphere of example 4.

What is claimed:

1. A luminous flux measuring apparatus for measuring the total flux of an illuminant comprising:
   an integrating hemisphere having a hemisphere shape, an inner wall and a first opening, said inner wall coated with a light diffusing material,
   a flat mirror covering said first opening of said integrating hemisphere, said flat mirror having a second opening located at the center of said flat mirror, said second opening formed in a configuration of longitudinal cross section of the illuminant,
   a photometer mounted on said integrating hemisphere, said photometer intercepting light from said integrating hemisphere, and
   means for holding the illuminant to be measured in said second opening.

2. A luminous flux measuring apparatus of claim 1 wherein said means for holding the illuminant having a rotation axis to rotate said illuminant to be measured.

3. A luminous flux measuring apparatus for measuring the total flux of an illuminant comprising:
   an integrating hemisphere having a hemisphere shape, an inner wall and a first opening, said inner wall having a light diffusing material disposed thereon,
   a flat mirror covering said first opening of said integrating hemisphere, said flat mirror having a second opening located at a center of said flat mirror, said second opening having a configuration identical to a cross section of the illuminant,
   a photometer disposed on said integrating hemisphere, said photometer intercepting light from said integrating hemisphere, and
   means for holding the illuminant in said second opening so that a luminous part of the illuminant is substantially perpendicular to said flat mirror.

4. A luminous flux measuring apparatus for measuring the total flux of an illuminant comprising:
   an integrating quarter sphere having a quarter sphere shape, an inner wall, an axis, and a center of curvature, said integrating quarter sphere also having a first and a second opening contiguous with each other at said axis of said integrating quarter sphere, said inner wall having a light diffusing material disposed thereon,
   a first flat mirror connected to a second flat mirror at said axis of said integrating quarter hemisphere for covering said first and said second openings, said connection of said first flat mirror and said second flat mirror having a third opening located at a center of said connection, said third opening having a cross sectional configuration identical to the illuminant,
   a photometer disposed on said integrating quarter sphere, said photometer intercepting light from said integrating quarter sphere, and
   means for holding the illuminant in said third opening at said center of curvature of said integrating quarter sphere.

* * * * *